(12) United States Patent
Crowley et al.

(10) Patent No.: US 11,597,330 B1
(45) Date of Patent: Mar. 7, 2023

(54) SUPPORT TROUGH

(71) Applicants: Roger E Crowley, Tualatin, OR (US);
James Bruce McMenamy, Clackamas, OR (US)

(72) Inventors: Roger E Crowley, Tualatin, OR (US);
James Bruce McMenamy, Clackamas, OR (US)

( * ) Notice: Subject to any disclaimer, the term of this patent is extended or adjusted under 35 U.S.C. 154(b) by 0 days.

(21) Appl. No.: 18/053,488

(22) Filed: Nov. 8, 2022

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC .. B60R 9/06; B60R 9/08; B60R 9/042; B60R 9/10
See application file for complete search history.

(56) References Cited

U.S. PATENT DOCUMENTS

| | | | | |
|---|---|---|---|---|
| 5,839,875 A * | 11/1998 | Miller | | B60P 3/07 414/537 |
| 6,296,290 B1 * | 10/2001 | Wolf | | B60R 9/06 296/26.11 |
| 11,400,850 B1 * | 8/2022 | Curtis, III | | B66F 9/18 |
| 2017/0029003 A1 * | 2/2017 | Crowley | | B62B 3/0612 |
| 2020/0406830 A1 * | 12/2020 | Owen | | B60R 9/06 |
| 2022/0024390 A1 * | 1/2022 | Johnstun | | B60P 7/0807 |
| 2022/0126759 A1 * | 4/2022 | Robinson | | B60R 9/12 |

* cited by examiner

*Primary Examiner* — Brian D Nash

(57) ABSTRACT

An equipment hauling apparatus for a vehicle comprises a tang assembly with a longitudinal portion having through-apertures for a typical receiver hitch and a vertical portion for holding a strut assembly. The strut attaches to a transverse trough for holding the equipment. The trough has sidewalls and a floor and cutouts which pass through these features. The ends of the trough have tabs with a lead-in angle for centering the equipment as it is loaded into the trough. The tabs have holes for receiving latch pins to lock the equipment within the trough for transport, and the latch pins are loosely attached to the trough by lanyards to prevent their misplacement. The strut and trough elevation is adjustable at its connection to the tang.

19 Claims, 4 Drawing Sheets

SUPPORT TROUGH

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to components of vehicle mounted fixtures for transporting equipment outside of but in close proximity to the vehicle and without need of a trailer or anything requiring additional wheels to be in contact with the ground or a road surface.

BACKGROUND

People who use vehicles to travel to recreational areas or job sites often want to carry more equipment than the internal cargo space or a body mounted bed can contain. Also, when transporting equipment which has become dirty from use, it is often preferred to transport the equipment outside of a plushly appointed vehicle interior.

BRIEF DESCRIPTION

A primary objective of the invention is to provide a support trough for supporting equipment which is desired to be transported exterior to a vehicle.

Another objective of the invention is to detachably secure the equipment to the trough so that it is retained during dynamic motions of the vehicle such as acceleration, deceleration, turns, abrupt maneuvers in traffic, and during shocks and vibration when traveling over rough or unimproved surfaces.

A corollary objective of the invention is to provide means for the support trough to be securely attached to a vehicle by its standard towing fixture such as a receiver hitch. Another corollary objective of the invention is to provide means to secure and detach transported equipment to the trough which may be operated by hand and without any tools or power sources.

Another objective of the invention is to secure the equipment at an orientation and elevation so that the trailing length of the equipment abaft of the vehicle is minimized. Another corollary objective of the invention is to obviate the need for a trailer axle when transporting the equipment.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. Where grammatical genders are concerned, any user of the invention may be of any gender regardless of specific pronouns or grammar used in this specification. Thus, masculine grammatical forms may always be interpreted to include and subsume feminine or any other grammatical genders.

Also in this specification, the preposition "by" may be used, among other common meanings, to indicate the ablative case and also the locative case.

The invention is an equipment hauling apparatus for a vehicle that comprises a tang assembly with a longitudinal portion having through-apertures for a typical receiver hitch and a vertical portion for holding a strut assembly. The strut attaches to a transverse trough for holding the equipment.

The trough has sidewalls and a floor and cutouts which pass through these features. The ends of the trough have tabs with a lead-in angle for centering the equipment as it is loaded into the trough. The tabs have holes for receiving latch pins to lock the equipment within the trough for transport, and the latch pins are loosely attached to the trough by lanyards to prevent their misplacement. The strut and trough elevation is adjustable at its connection to the tang.

Figure 1:
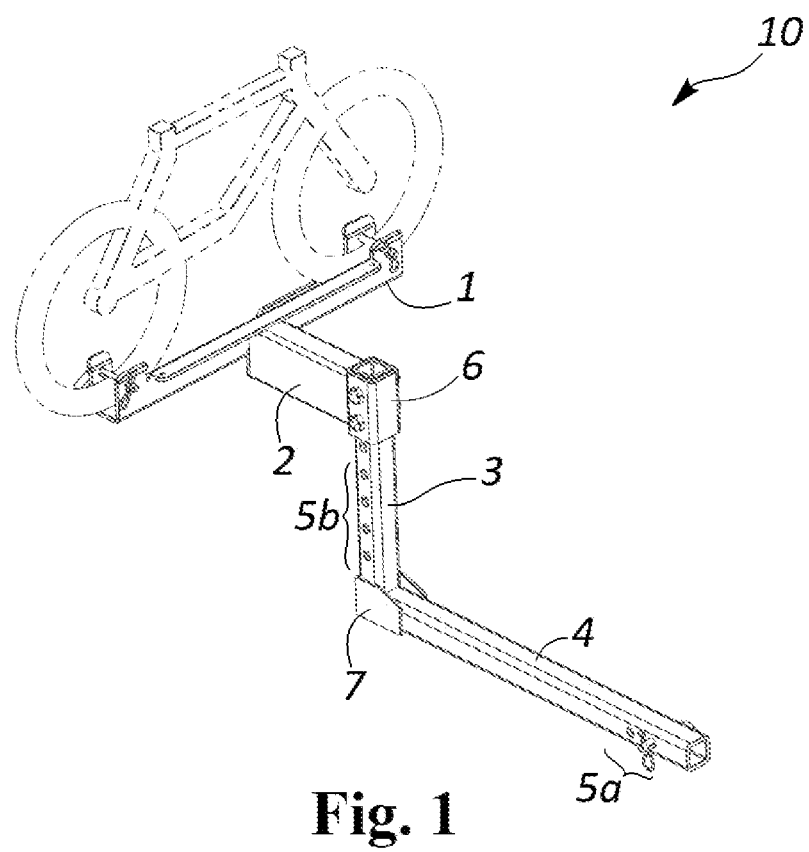
FIG. 1 shows an oblique, right top front view of a support trough assembly in accordance with the invention.

Referring now to the figures, FIG. 1 shows an oblique, right top front view of a support trough assembly in accordance with the invention. The inventive equipment hauling apparatus is configured to attach to a vehicle such as by its receiver hitch or an equivalent attachment affordance. The apparatus is an assembly [10] including a tang assembly which further comprises a longitudinal portion [4] having a first set [5a] of at least one transverse through-aperture for engaging with a typical receiver hitch of a passenger vehicle or light or medium truck. The tang also includes a vertical portion [3] having a second set [5b] of at least one transverse through-aperture, which is preferable plurality of holes in a linear array to allow a similarly perforated section of tube [6] to be adjustably affixed to the vertical portion of the tang. The tube is part of a strut assembly which includes a longitudinal strut [2] to which a transverse trough [1] is attached. Fasteners which pass through the aligned sets of through-apertures in the strut assembly and the vertical portion of the tang allow the height of the trough to be above an ideal or theoretical road surface to be vertically adjusted. The embodiment of the tang as shown is a built-up assembly of a transverse or horizontal bar and a vertical bar with reinforcing gusset plates [7] at their juncture to form an "L." Other equivalent embodiments such as a unitary, formed "J" bar having a first and second leg joined by a curved apex also reside within the scope of the invention.

Figure 2:
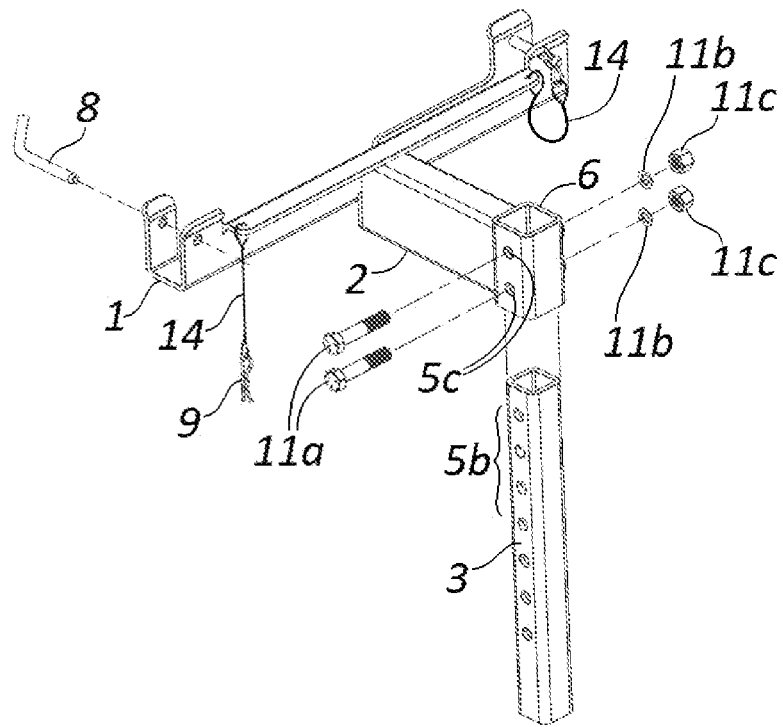
FIG. 2 shows an oblique, right top front view of a support trough and some of its proximate components of the support trough assembly of FIG. 1.

FIG. 2 shows an oblique, right top front view of a support trough and some of its proximate components of the support trough assembly of FIG. 1 which comprise the strut assembly. A vertical portion [3] of the tang is also presented. The strut assembly comprises a proximal end having a tube [6] with a tang-receiving aperture with a third set [5c] of at least one transverse through-aperture registerable with the second set [5b] of through-apertures in the tang. Fasteners pass though the aligned sets of through-apertures and in the embodiment shown these include threaded bolts [11a,] washers or lock washers [11b,] and complementary nuts [11c.] The distal end of the strut [2] is affixed such as by welding to a second transverse wall of a transverse trough [1.]

After equipment to be transported has been loaded and positioned with a portion of its frame, or wheel rims, or the like being received within the trough and between its sidewalls, then latching pins [8] are used to lock the equipment in place. In the embodiment shown, two latching pins pass through pairs of coaxially aligned holes in the sidewalls of the trough. The pins may optionally pass through holes in the equipment or simply trap a portion of it within a closed contour formed by the two trough sidewalls bestriding the equipment, the pin passing above and the trough floor connecting the sidewalls passing below the equipment.

Figure 6A:
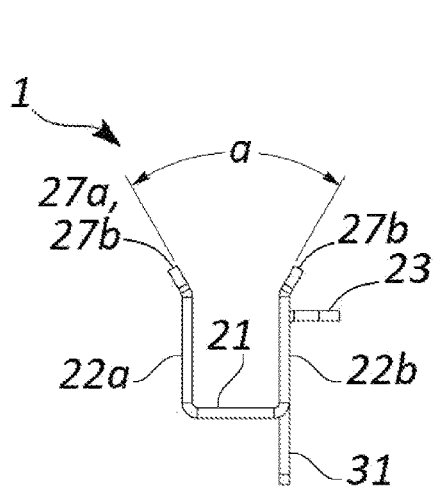
FIG. 6*a* shows a right side elevation view of the support trough of FIG. 1.

In the exemplary embodiment two latch pins [8] are provided to secure a left portion and a right portion of the equipment, although additional pins for securing the equipment at other points also reside within the scope of the invention. A first pin is receivable through first and second proximal apertures of the transverse trough and a first lanyard [14] secures the first pin by a proximal aperture in a shelf portion of the trough. As is best seen in FIG. 6a, the shelf provides structural rigidity of the trough by substantially increasing the section modulus defined by its cross section. A second pin is receivable through first and second distal apertures of the transverse trough, and a second lanyard [14] secures the second pin by the distal aperture of the shelf.

The latch pins are secured from release by detents or snap-in locking means such as cotter pins [9.] In alternative embodiments of the invention other releasable hardware passing through the through apertures of the trough may be employed, such as snap links, threaded hardware, quick-release pins such as those including a T-handle and a button which releases a ball detent, and hitch pins or lynch pins. Redundant locking hardware such as keepers may also be employed to trap removable release hardware in place, and security devices such as padlocks may be employed to secure the equipment against theft.

Figure 3A:
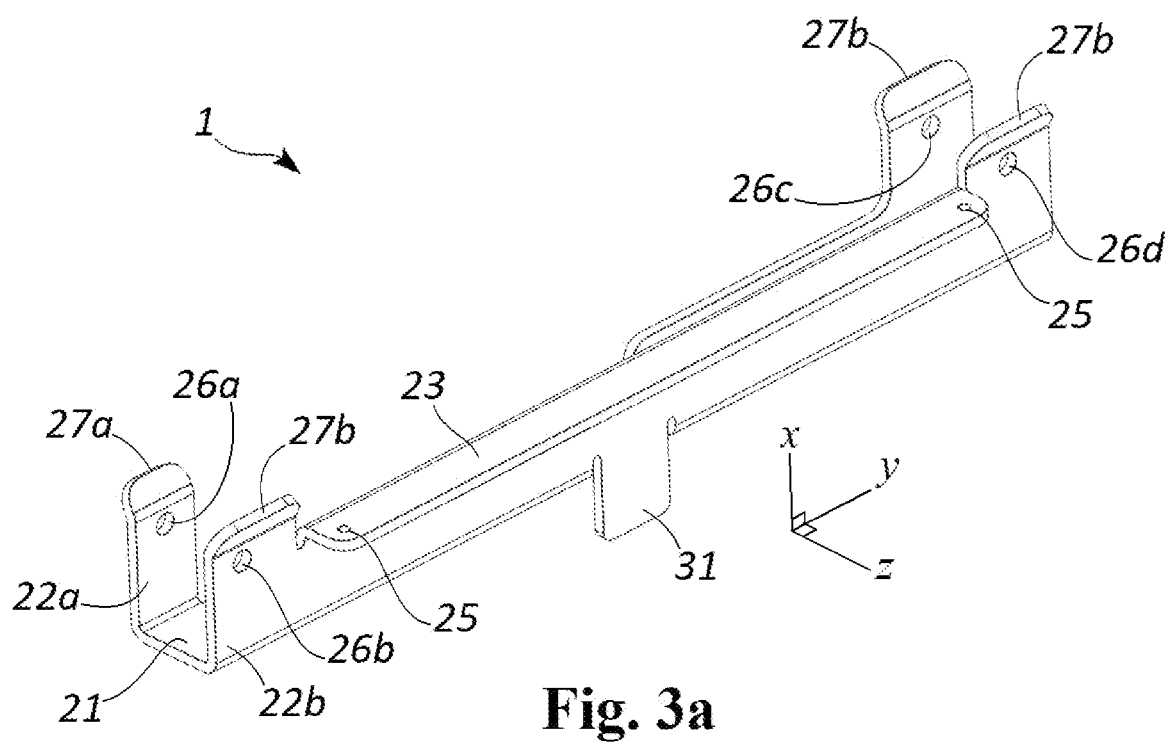
FIG. 3*a* shows an oblique, right top front view of the support trough of FIG. 1.

FIG. 3a shows an oblique, right top front view of the support trough [1] of FIG. 1. In this oblique figure an exemplary coordinate axis is included to illustrate vertical directions in [x,] transverse directions in [y,] and longitudinal directions in [z.] The vertical axis defines common words such as but not limited to "up," "upper," "height," "above," "down," "below," "lower," and "beneath;" the transverse axis defines words such as but not limited to "left," "right," "proximal," "distal," "medial," "width," and "athwart;" and the longitudinal axis defines words such as but not limited to "front," "forward," "rear," "ahead," "behind," "aft,'" and "abaft." The orientation of the coordinate system is arbitrary and is presented for convenience. The [x,] [y,] and [z] directions are also referred to herein as first, second, and third directions.

The trough comprises two vertical sidewalls spaced apart with a floor [21] spanning between them. Thus a first wall [22a] and a second wall [22b] each extend in a first height direction [x] and in a second transverse direction [y] orthogonal to the first direction. The first and second walls each also have first and second edges extending along the second direction from a first end seen at proximal tab [27a] to a second end at distal tab [27b] of the same wall. The first edges are lower edges and the second edges are upper edges. Because this figure is in an oblique, "proximal" features and directions, and the first ends of the sidewalls and floor of the trough appear in the lower left portion of the figure while "distal" features and directions, and the second ends of the sidewalls and floor of the trough appear in the upper right left portion of the figure.

The first and second walls of the transverse trough are spaced apart in a third direction [z] orthogonal to both the first and the second directions. The transverse floor [21] and the transverse first and second walls extend along the second direction from their first or proximal ends to their second or distal ends. The floor spans between the first edges of the sidewalls.

The second edge of the first wall [22a] comprises a first proximal tab [27a] at its first end and a first distal tab [27b] at the second end of the second edge of the first wall. The second wall [22b] also comprises a second proximal tab at the first end of its second edge and a second distal tab at the second end of its second edge. Mutually inward facing surfaces of the first and second proximal tabs subtend a first included angle, and mutually inward facing surfaces of the first and second distal tabs subtend a second included angle. The included angles are seen true in side view FIGS. 6a and 6b and in preferable embodiments these angles are equal.

The first wall further comprises a first proximal aperture [26a] proximate to an edge of the first proximal tab and a second proximal aperture [26b] proximate to an edge of the second proximal tab. The first wall further comprises a first distal aperture [26c] proximate to an edge of the first distal tab and a second distal aperture [26d] proximate to an edge of the second distal tab.

The second transverse wall further comprises a shelf [23] substantially parallel to the transverse floor, with the shelf further comprising a proximal through aperture [25a] proximate to the second proximal aperture and a distal through aperture [25b] proximate to the second distal aperture. The transverse width dimension of the trough defines a midpoint, and a medial tab [31] extends downward from the first edge of the second wall at or near its midpoint.

Figure 3B:
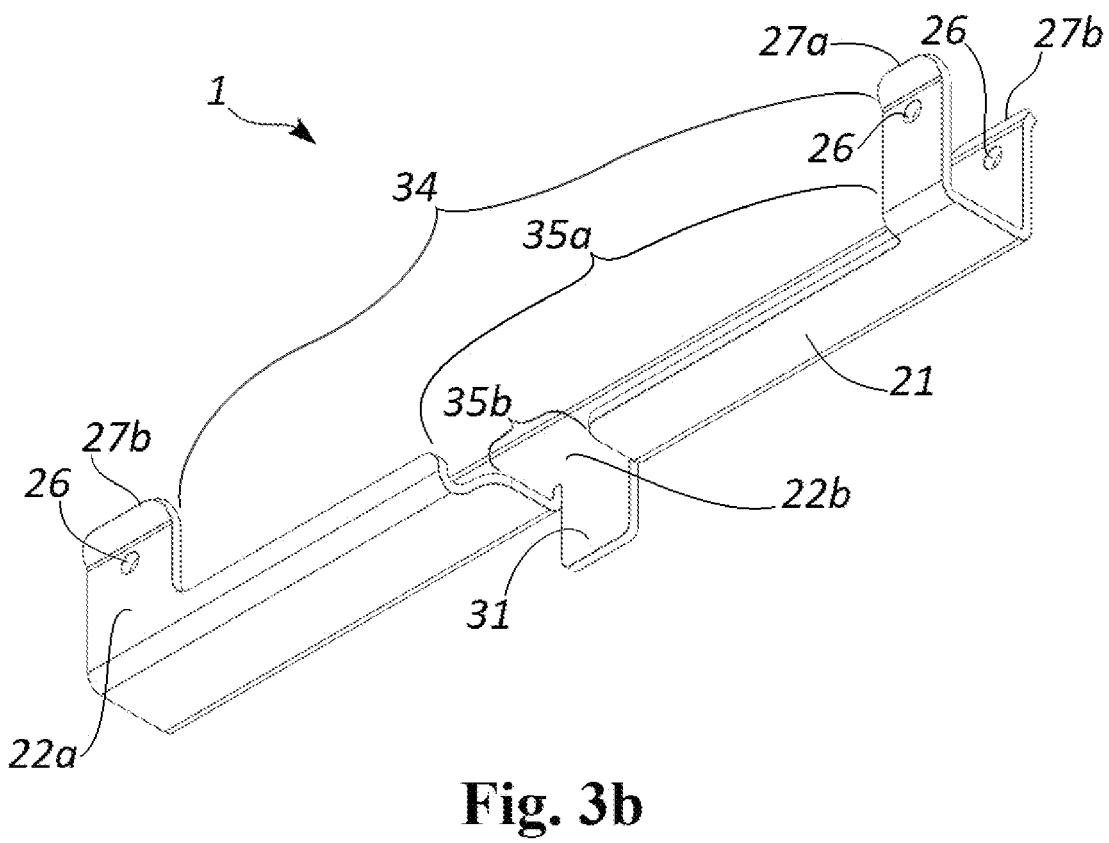
FIG. 3*b* shows an oblique, right bottom rear view of the support trough of FIG. 1.

FIG. 3b shows an oblique, right bottom rear view of the support trough [1] of FIG. 1. The trough features include a first transverse wall [22a] and a transverse floor [21,] with a first cutout [35a] having a cross section parallel to the transverse floor and passing through first and second edges of the first transverse wall and a first portion of the transverse floor. A second cutout [35b] also has a cross section parallel to the transverse floor and passes through the first and second edges of the first transverse wall and a second portion of the transverse floor. A third cutout [34] having a cross section parallel to the second transverse wall passes through the second edge of the first transverse wall.

The first wall [22a] and second wall [22b] each extend in a first direction, which is a transverse direction, from a first end seen at proximal tab [27a] to a second end at distal tab [27b] of the same wall, and in a second direction which is also a vertical or upward direction orthogonal to the first direction. The mutually inward facing surfaces of the first and second distal tabs subtend a first included angle.

The floor [21] spans between the first edges of the first and second walls and extends along the first direction from the first end of the second wall to the second end of the second wall.

The trough further comprises a first cutout having a cross section parallel to the floor and passing through the first and second edges of the first wall and a first portion of the floor, a second cutout having a cross section parallel to the floor and passing through the first and second edges of the first wall and a second portion of the floor, and a third cutout having a cross section parallel to the second wall and passing through the second edge of the first wall. In particular embodiments the second cutout is symmetrically aligned with the medial tab.

The trough also includes a first distal tab at the second end of the second edge of the first wall, and a second distal tab at the second end of the second edge of the second wall, with mutually inward facing surfaces of the first and second distal tabs subtending a second included angle. The first transverse wall of the trough has a first proximal aperture proximate to an edge of the first proximal tab, a second proximal aperture proximate to an edge of the second proximal tab, a first distal aperture proximate to an edge of the first distal tab, and a second distal aperture proximate to an edge of the second distal tab. The apertures [26,] more colloquially worded as "holes," are paired to receive the locking pins for securing the equipment in the trough. The cutouts are configured to admit but laterally constrain some portion of the equipment, such as a pedal crank for a bicycle, so that once pinned within the trough against vertical excursion, this other portion of the equipment is trapped transversely within the sum of the cutouts.

The strut assembly seen in FIG. 2 includes a cantilever beam connecting the trough to the perforated rectangular or square-walled tube for attachment to the tang. The cantilever beam may be a rectangular tube, a solid beam, a channel, or an I-section beam. At the midpoint of the trough, the second wall includes a down-wardly projecting medial tab [31] so that when abutted to the cantilever beam, the entire perimeter of the cantilever beam may be welded to the trough.

Figure 4A:
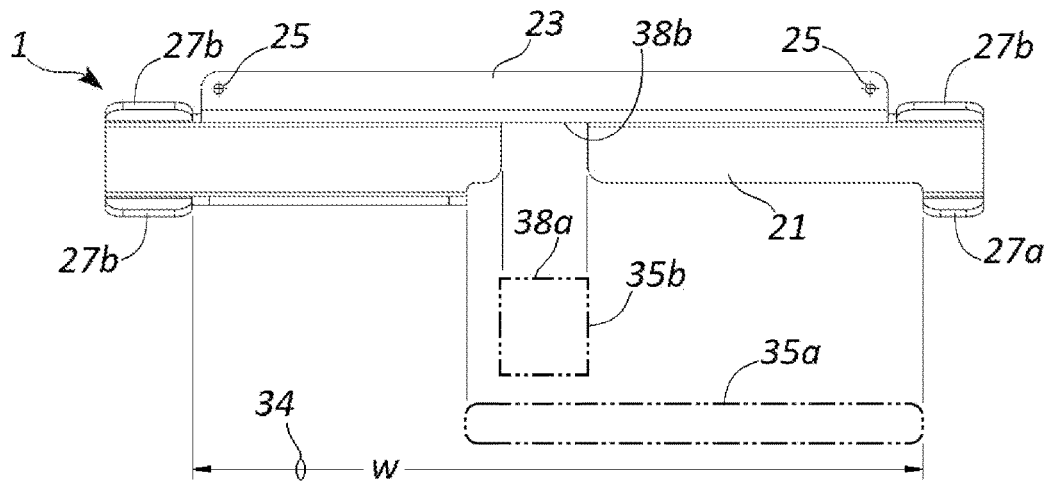
FIG. 4*a* shows a top view of the support trough of FIG. 1.

FIG. 4a shows a top view of the support trough of FIG. 1. The [1] trough includes a combination of cutouts for admitting particular features of the equipment to be transported. These cutouts are shown as phantom line contours displaced from their actual position on the trough so they may be described separately. A first cutout [35b] has a cross section parallel to the floor [21] of the trough and passing through the first and second edges (i.e, top and bottom edges) of the first wall and a first portion of the floor. A second cutout [35a] has a cross section parallel to the floor and passing through the first and second edges of the first wall and a second portion of the floor. The second cutout as a width along the first direction which is greater than a width along the first direction of the first cutout. The second cut out passes though the entire first wall but only cuts into part of the longitudinal width of the trough, but the first cutout comprises a medial edge [38a] collinear with the second edge [38b] of the second wall and proximate to the medial tab as previously seen in the oblique view FIG. 3b.

The top view also shows the shelf [23] portion of the trough and its two through apertures [25] near the transverse or lateral edges of the shelf. The lead-in tabs seen from above flare out to longitudinal widths at their tips which are greater than the inner width of the trough walls. These additional widths may catch the equipment as it is being loaded and guide it as it is lowered into the trough. Being particularly configured to certain sorts of equipment, a transverse width of one of the tabs [27a] seen in lower right of the trough in this view is shorter than the transverse widths of the other three tabs [27b.]

The third trough cutout [34] cuts though the upper edge and part of the upper portion of the first sidewall of the trough and is indicated in this figure as a dimension [w.]

Figure 4B:
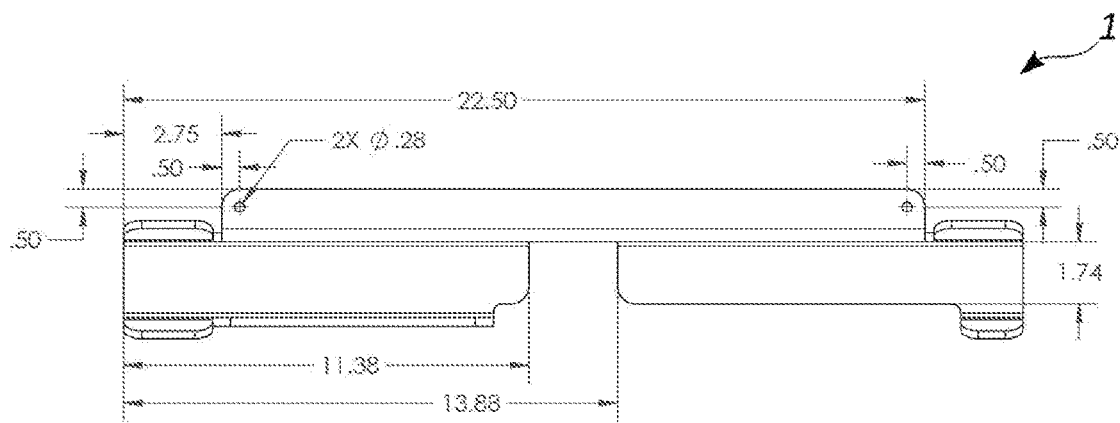
FIG. 4*b* shows the top view of the support trough of FIG. 4*a* including exemplary dimensions for a particular embodiment thereof.

FIG. 4b shows the top view of the support trough of FIG. 4a including exemplary dimensions for a particular embodiment thereof.

Figure 5A:
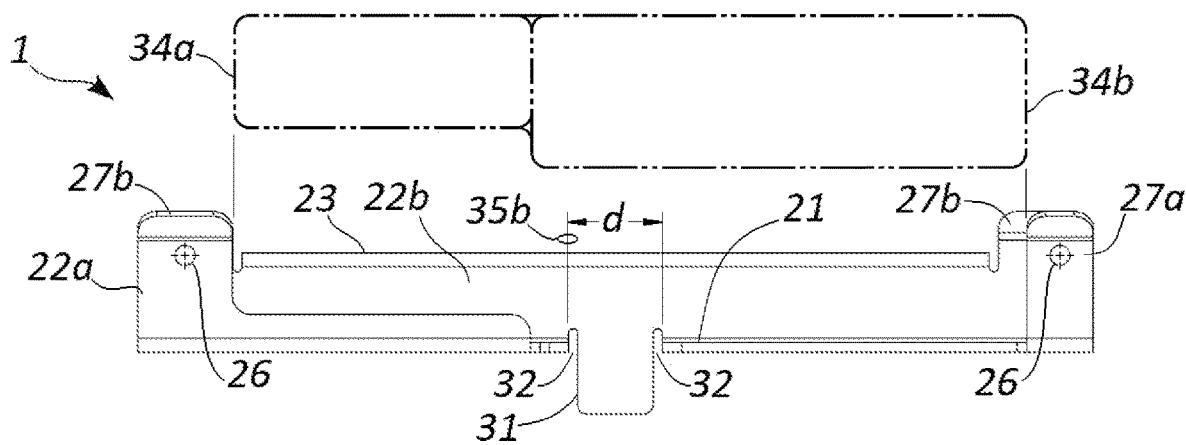
FIG. 5*a* shows a rear elevation view of the support trough of FIG. 1.

FIG. 5a shows a rear elevation view of the support trough [1] of FIG. 1. The third cutout has a cross section parallel to the second wall and passes through the first edge of the first wall [22a] but does not cut into the second wall [22b.] The cutout may be modeled as two abutted rectangles [34a] and [34b.] Both rectangles cut the upper edge of the first wall, but only one of the rectangles cuts both the upper and lower edge of the sidewall to expose the floor [21] of the trough. This portion of the cutout extends wider than the medially located tab [31] of the second wall which extends below the floor of the trough. A pair of slots [32] bestride the tab for relief during a sheetmetal bending process for forming the floor of the trough and the bottom of the second wall.

The second cutout [35b] of the previous figure may be optionally defined in this place as a fourth cutout of a width dimension [d] proceeding up to the visible surface of the medial tab. The top surface of the shelf [23] is also visible in this view. The first and second proximal apertures are seen as coaxial circles [26] in this view and the first and second distal apertures are also coaxial circles. In the exemplary embodiment shown, a width of the first proximal tab [27a] is less than a width of the first distal tab [27b] while the widths of the tabs on the second wall are equal or more nearly so.

Figure 5B:
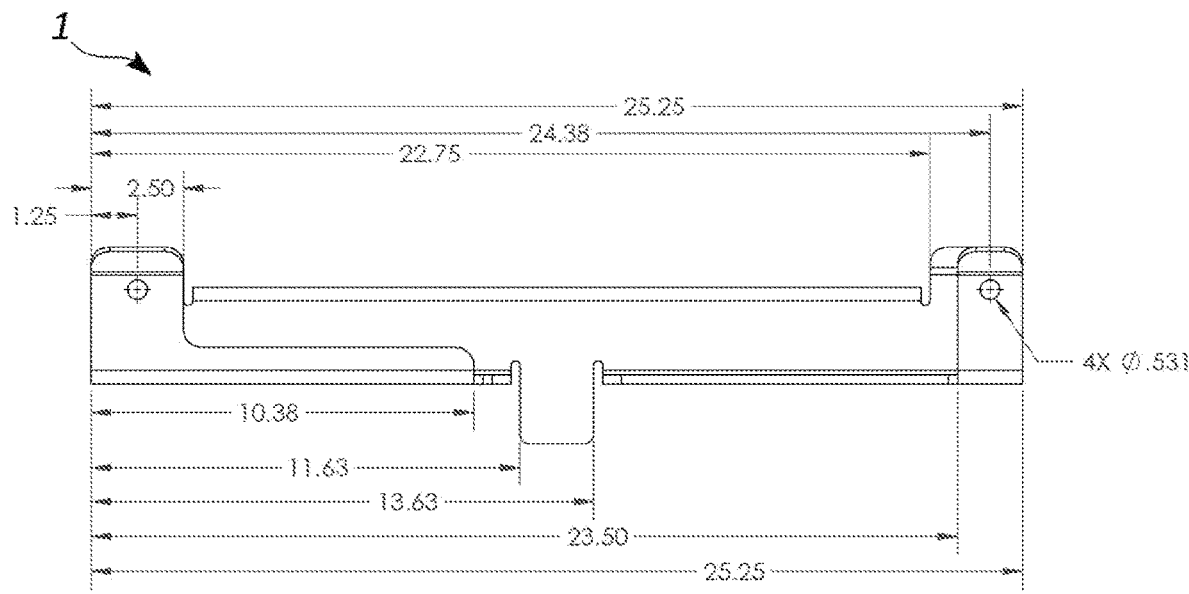
FIG. 5*b* shows the rear elevation view of the support trough of FIG. 5*a* including exemplary dimensions for a particular embodiment thereof.

FIG. 5b shows the rear elevation view of the support trough of FIG. 5a including exemplary dimensions for a particular embodiment thereof.

FIG. 6a shows a right side elevation view of the support trough of [1] FIG. 1. This side view shows the first wall [22a,] the second wall [22b,] the floor [21,] and its shelf [23] substantially parallel to the floor, which means it is also substantially perpendicular to the second wall to which it is attached. In this specification the word "substantially" as regards these geometrical angles shall be taken to mean "to within 15° of the theoretically exact or ideal geometrical criterion."

The medial tab [31] is seen extending from the first edge of the second wall to below the floor of the trough. The tabs [27a, 27b] extending upward and outwardly from the upper edges of the sidewalls have mutually inward facing surfaces which subtending an included angle [a] which acts as a lead-in angle for centering the equipment as it is loaded into the trough.

Figure 6B:
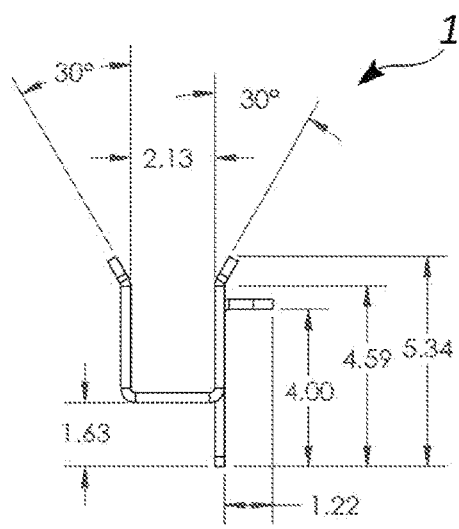
FIG. 6*b* shows the right side elevation view of the support trough of FIG. 5*a* including exemplary dimensions for a particular embodiment thereof.

FIG. 6b shows the right side elevation view of the support trough of FIG. 5a including exemplary dimensions for a particular embodiment thereof. In preferable embodiments, the outwardly flaring angles of the tabs and their mutually inward facing surfaces align, such that a first included angle subtended by the first and second proximal tabs is the same as a second included angle subtended between the first and second distal tabs.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Thus, unauthorized instances of apparatuses and methods claimed herein are to be considered infringing, no matter where in the world they are advertised, sold, offered for sale, used, possessed, or performed.

Consequently and in summary, although many exemplary embodiments are described above, it will be appreciated that the invention is intended to cover all modifications and equivalents within the scope of the following claims.

What is claimed is:

1. A trough comprising:
   first and second walls each extending in
      a first direction and in a second direction orthogonal to said first direction,
      said first and second walls each also having first and second edges extending along said second direction from a first end to a second end,
      said first and second walls also spaced apart in a third direction orthogonal to both said first and said second directions,
      said first wall further comprising a first proximal tab at said first end of said second edge of said first wall and said second wall further comprising a second proximal tab at said first end of said second edge of said second wall,
      with mutually inward facing surfaces of said first and second proximal tabs subtending a first included angle and
      a floor spanning between said first edges of said first and said second walls and extending along said first direction from said first end of said second wall to said second end of said second wall;
   said trough further comprising:
      a first cutout having a cross section parallel to said floor and passing through said first and second edges of said first wall and a first portion of said floor,
      a second cutout having a cross section parallel to said floor and passing through said first and second edges of said first wall and a second portion of said floor, and
      a third cutout having a cross section parallel to said second wall and passing through said second edge of said first wall.

2. The trough of claim 1, further comprising a first distal tab at said second end of said second edge of said first wall, and a second distal tab at said second end of said second edge of said second wall, with mutually inward facing surfaces of said first and second distal tabs subtending a second included angle.

3. The trough of claim 2, wherein a width of said first proximal tab is less than a width of said first distal tab.

4. The trough of claim 2, wherein said first wall further comprises a first proximal aperture proximate to an edge of said first proximal tab and a second proximal aperture proximate to an edge of said second proximal tab.

5. The trough of claim 4, wherein said first and second proximal apertures are coaxial circles.

6. The trough of claim 2, wherein said first wall further comprises a first distal aperture proximate to an edge of said first distal tab and a second distal aperture proximate to an edge of said second distal tab.

7. The trough of claim 6, wherein said first and second distal apertures are coaxial circles.

8. The trough of claim 1, wherein said first cutout comprises a medial edge collinear with said first edge of said second wall.

9. The trough of claim 8, wherein said second wall further comprises a medial tab proximate to said medial edge.

10. The trough of claim 1, wherein a width along said first direction of said second cutout is greater than a width along said first direction of said first cutout.

11. The trough of claim 1, wherein said second wall further comprises a shelf substantially parallel to said floor.

12. An equipment hauling apparatus for a vehicle comprising:
   a tang assembly further comprising
      a longitudinal portion having a first set of at least one transverse through-aperture and
      a vertical portion having a second set of at least one transverse through-aperture,
   a strut assembly comprising
      a proximal end having a tang-receiving aperture with a third set of at least one transverse through-aperture registerable with said second set and
      a distal end affixed to a second transverse wall of a transverse trough, said trough further comprising:
         a first transverse wall and a transverse floor,
         a first cutout having a cross section parallel to said transverse floor and passing through first and second edges of said first transverse wall and a first portion of said transverse floor,
         a second cutout having a cross section parallel to said transverse floor and passing through said first and second edges of said first transverse wall and a second portion of said transverse floor, and
         a third cutout having a cross section parallel to said second transverse wall and passing through said second edge of said first transverse wall.

13. The equipment hauling apparatus of claim 12, wherein said transverse trough further comprises
   a first proximal tab at a first end of said first transverse wall and a first distal tab at a second end of said first transverse wall, and
   a second distal tab at a first end of said second transverse wall and a second distal tab at a second end of said second transverse wall,
   with mutually inward facing surfaces of said first and second proximal tabs subtending an included angle, and mutually inward facing surfaces of said first and second distal tabs also subtending said included angle.

14. The equipment hauling apparatus of claim 13, wherein a width of said first proximal tab is less than a width of said first distal tab.

15. The equipment hauling apparatus of claim 13, wherein said first transverse wall of said trough further comprises
   a first proximal aperture proximate to an edge of said first proximal tab,
   a second proximal aperture proximate to an edge of said second proximal tab,
   a first distal aperture proximate to an edge of said first distal tab, and
   a second distal aperture proximate to an edge of said second distal tab.

16. The equipment hauling apparatus of claim 15, wherein said first and second proximal apertures are coaxial circles, and said first and second distal apertures are coaxial circles.

17. The equipment hauling apparatus of claim 16, wherein said second transverse wall further comprises a shelf substantially parallel to said transverse floor, with said shelf further comprising a proximal through aperture proximate to said second proximal aperture and a distal through aperture proximate to said second distal aperture.

18. The equipment hauling apparatus of claim 17, further comprising a first pin receivable through said first and second proximal apertures of said transverse trough and a first lanyard securing said first pin by said proximal aperture of said shelf.

19. The equipment hauling apparatus of claim 18, further comprising a second pin receivable through said first and second distal apertures of said transverse trough and a second lanyard securing said second pin by said distal aperture of said shelf.

* * * * *